UNITED STATES PATENT OFFICE.

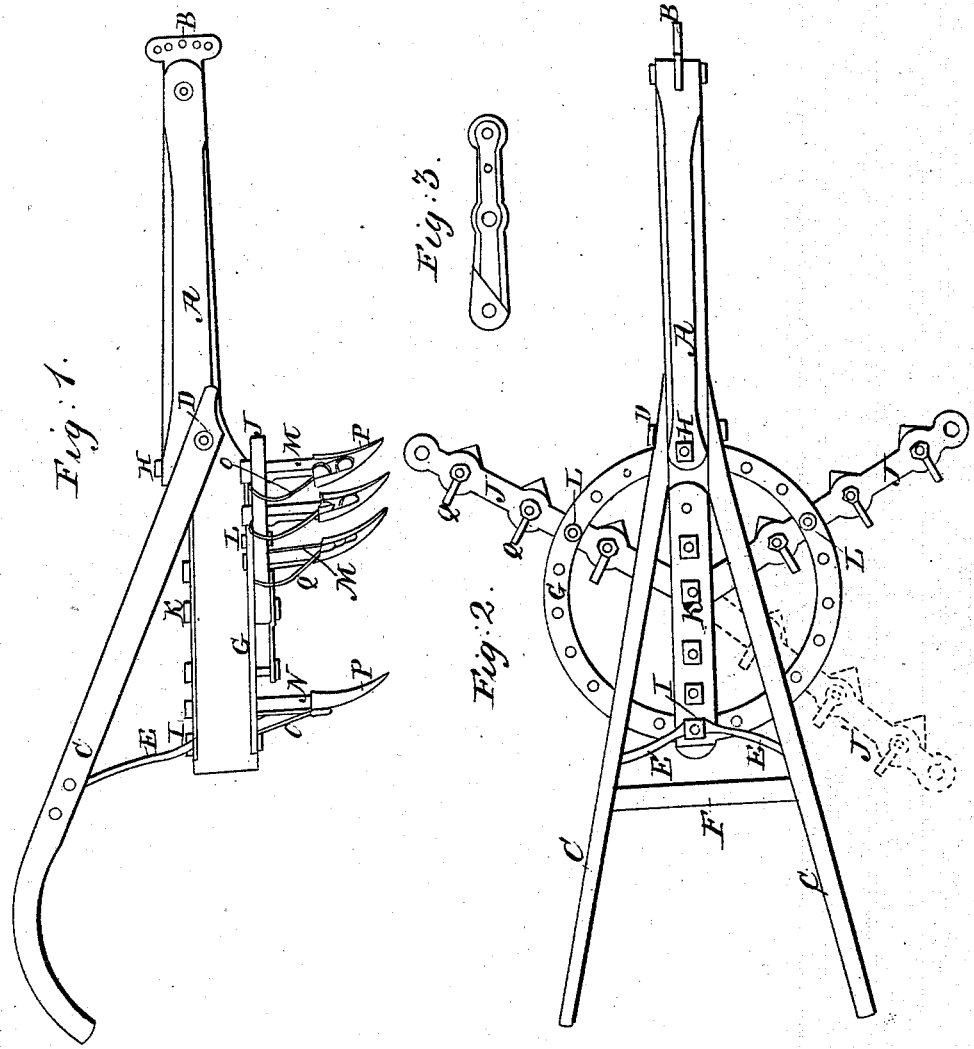

HENRY GILLIARD, OF MOUNT HOPE, WISCONSIN.

IMPROVEMENT IN CULTIVATORS.

Specification forming part of Letters Patent No. 26,581, dated December 27, 1859.

*To all whom it may concern:*

Be it known that I, HENRY GILLIARD, of Mount Hope, in the county of Grant and State of Wisconsin, have invented a new, useful, and Improved Cultivator; and I do hereby declare that the same is described and represented in the following specification and drawings.

To enable others skilled in the art to make and use my invention, I will proceed to describe its construction and operation, referring to the drawings, in which the same letters indicate like parts in each of the figures.

Figure 1 is an elevation of my improved cultivator. Fig. 2 is a plan or top view. Fig. 3 is a short bar to be used in narrow rows of crops.

The nature of my improvement consists in a circle fastened permanently to the beam, and provided with holes for the bolts, which hold the jointed bars carrying the cultivator-teeth, which bars are hinged to the beam in the center of the circle, so that they can be vibrated and arranged to stand forward opposite to or behind the center of the circle.

In the accompanying drawings, A is the beam, with a clevis, B, at the fore end, to which the animal is hitched to draw the cultivator.

C C are handles fastened to the beam by the bolt D, and supported by the braces E E, and connected by the bar F, as shown in the drawings, Fig. 2.

G is a circle of metal, fastened to the beam A by the bolts H and I.

J J are vibrating bars fastened together and to the beam A by the bolt K, which is in the center of the circle G, which circle is provided with a series of holes for the bolts L L, which fasten the bars J J to the circle G in such position as may be desired, as shown by the lower bar, J, in the drawings, which is shown in a different position by dotted lines at J', Fig. 2. The bars J J being jointed on the bolt K, the outer ends of the bars may be set forward, so that the teeth will turn the earth from the rows of crops; or they may be set at right angles to the beam, so as to leave the dirt nearly level when working in grain sown broadcast; or the outer ends of the bars may be set back toward or under the handles, so as to work the dirt from the middle of the row toward the crop. The holes in these bars are made octagonal, and the upper ends of the shanks are made eight-square to fit the holes, and the shanks are fastened into the bars by screw-nuts, so that the shanks M M can be taken out and turned to such position as may be desired to perform the work in hand, and when once put in and fastened there is no danger of their turning so long as the nut on the upper end remains tight. The shank of the middle tooth, N, is square, and it is fastened in the beam A either before or behind the bolt K, as may be preferred, and this tooth has a brace, O, fastened by the screw I.

The blades P P may be made of steel and fastened to the shanks of the teeth by bolts, as shown in Fig. 1, and the curved braces Q Q are fastened to the shank by one of the bolts that fastens the blade, and these braces extend up over the top of the bar J onto the upper ends of the shanks, as shown in the drawings, and are fastened by the screw-nuts on the upper ends of the shanks.

When the crops are small the bars may be set at right angles to the beam and the middle tooth taken out and two horses hitched to the beam, so as to work two rows at the same time; and when the crops have become too large to work two rows at a time the bars J J may be removed and some short bars, like the one shown in Fig. 3, substituted, so as to work one row at a time; and when it is wanted to furrow or mark out ground for planting all the teeth may be taken out except the center one in the beam and one in the outer end of each bar, when it will mark three rows at once at such a distance apart as may be required; and if all the teeth are put in it is an excellent implement for working in grain sown broadcast.

I believe I have described and represented my improved cultivator so as to enable any person skilled in the art to make and use it.

I will now state what I desire to secure by Letters Patent, to wit:

I claim—

The arrangement of the permanent circles G and jointed bars J J, when the whole is constructed for joint operation as set forth.

HENRY GILLIARD.

Witnesses:
J. B. LYNN,
J. G. SNYDER.